No. 739,238. PATENTED SEPT. 15, 1903.
J. L. VAN NORT.
TELLURIAN.
APPLICATION FILED MAR. 18, 1903.
NO MODEL. 4 SHEETS—SHEET 1.
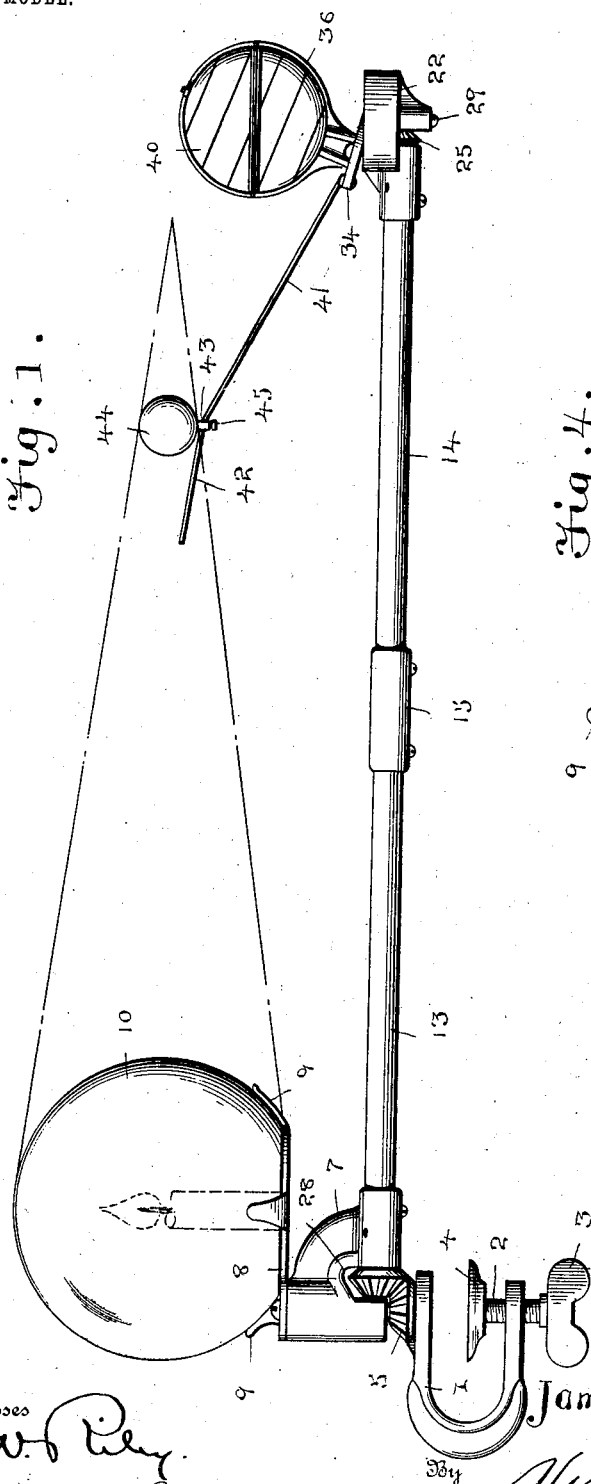
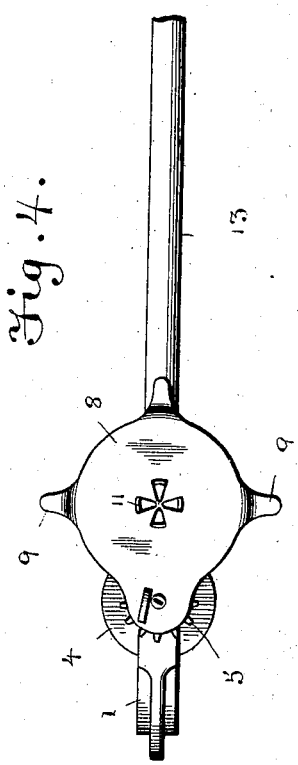
Inventor
James Louis Van Nort.
By Victor J. Evans
Attorney
Witnesses

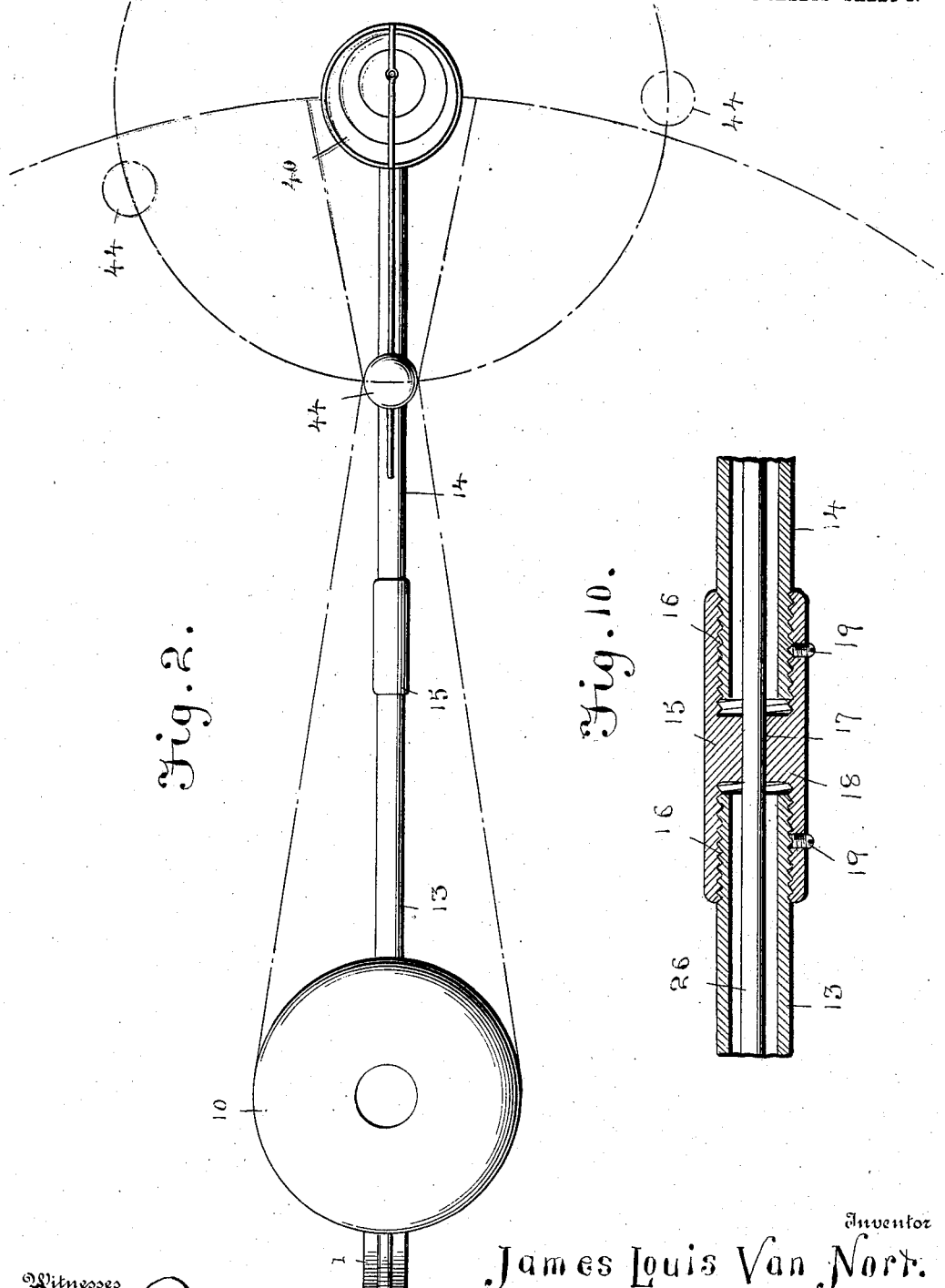

No. 739,238. PATENTED SEPT. 15, 1903.
J. L. VAN NORT.
TELLURIAN.
APPLICATION FILED MAR. 18, 1903.
NO MODEL. 4 SHEETS—SHEET 3.

Witnesses
Inventor
James Louis Van Nort.
By Victor J. Evans
Attorney

No. 739,238. PATENTED SEPT. 15, 1903.
J. L. VAN NORT.
TELLURIAN.
APPLICATION FILED MAR. 18, 1903.
NO MODEL. 4 SHEETS—SHEET 4.
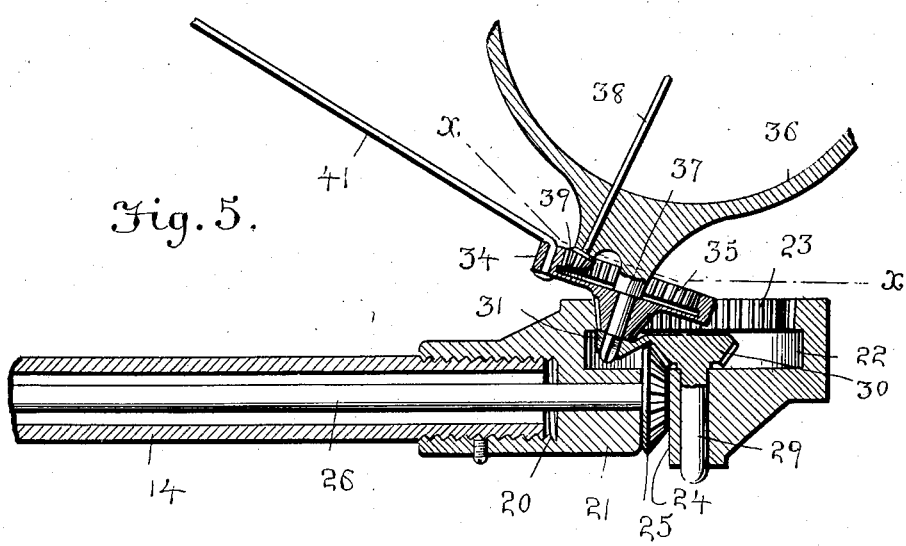
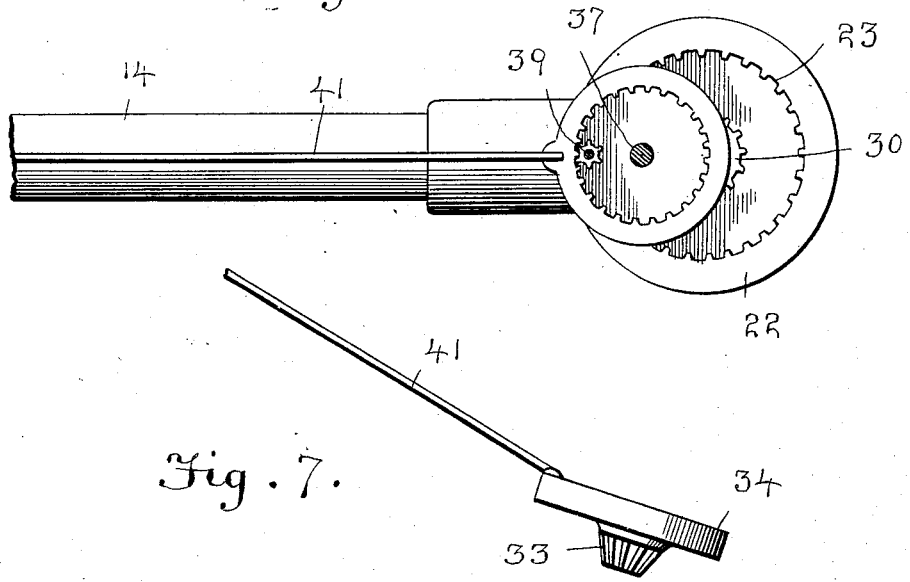
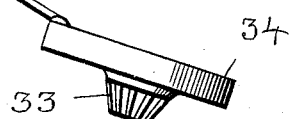
Witnesses
Inventor
James Louis Van Nort.
By Victor J. Evans
Attorney No. 739,238. Patented September 15, 1903.

UNITED STATES PATENT OFFICE.

JAMES LOUIS VAN NORT, OF BELLEVIEW, MISSOURI.

TELLURIAN.

SPECIFICATION forming part of Letters Patent No. 739,238, dated September 15, 1903.

Application filed March 18, 1903. Serial No. 148,416. (No model.)

*To all whom it may concern:*

Be it known that I, JAMES LOUIS VAN NORT, a citizen of the United States, residing at Belleview, in the county of Iron and State of Missouri, have invented new and useful Improvements in Tellurians, of which the following is a specification.

My invention relates to new and useful improvements in tellurians; and its object is to provide a simple device which may be readily operated and which will accurately illustrate the relative positions of the earth, sun, and moon at all periods.

The invention consists in providing mechanism adapted to revolve with a sphere employed to indicate the sun, and this mechanism is so constructed as to rotate the earth sphere of the tellurian upon its axis, which is arranged at an incline.

The invention also consists in providing a moon sphere which is held in proper relation to the earth sphere and is adapted to rotate in proper relation to the earth sphere during the movement of said spheres around the sphere indicating the sun of the system.

The invention also consists in providing certain novel arrangement of gears and shafts whereby the proper movements of the various spheres may be obtained.

The invention also consists in the further novel construction and combination of parts hereinafter more fully described and claimed, and illustrated in the accompanying drawings, showing the preferred form of my invention, and in which—

Figure 3:
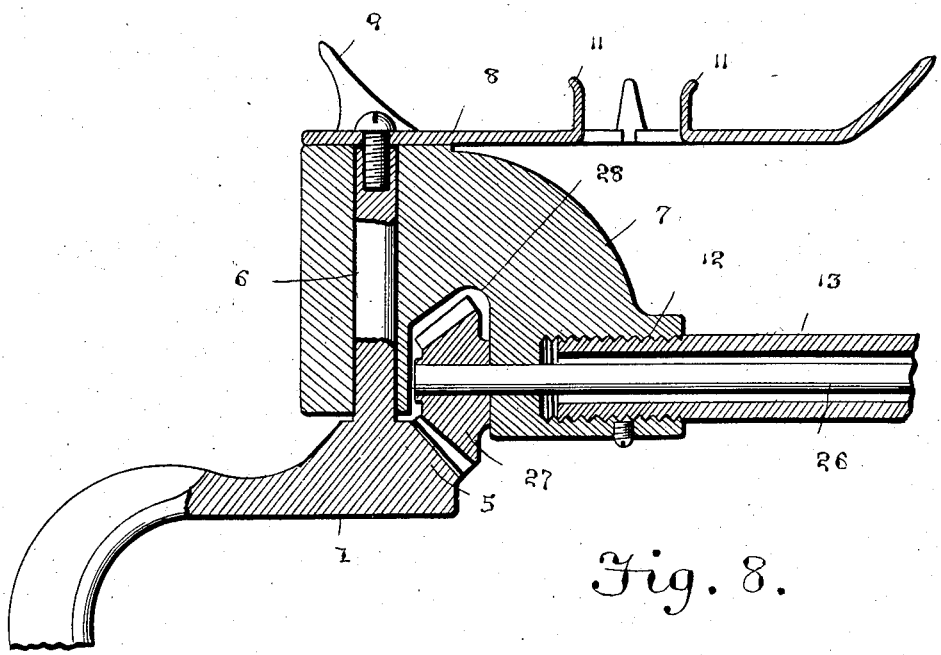
Figure 8:
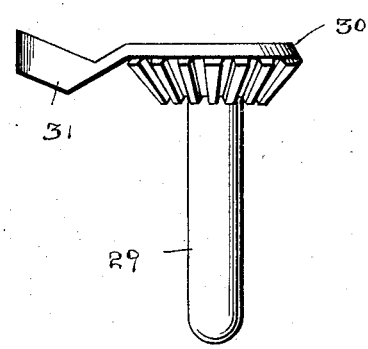
Figure 9:
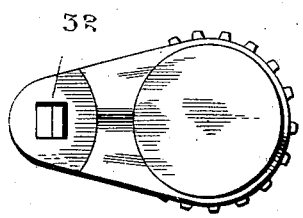

Figure 1 is a side elevation of my improved tellurian. Fig. 2 is a plan view of the device and showing in dotted lines the orbits of the various spheres and the area of the shadow cast by the moon sphere. Fig. 3 is an enlarged vertical section through one end of the tellurian and showing the holder used for securing in position the transparent globe or sun sphere. Fig. 4 is a plan view of the end of the tellurian indicated in Fig. 3 and with the sun sphere removed. Fig. 5 is an enlarged section through the other end of the tellurian and showing the gearing for operating the earth and moon spheres. Fig. 6 is a section on line *x x*, Fig. 5. Fig. 7 is a detail view of a portion of the moon-sphere holding-arm and the gear connected thereto. Fig. 8 is a detail view of the gear used for holding the support of the earth sphere in position. Fig. 9 is a plan view of said gear, and Fig. 10 is a section through the connecting-sleeve used for attaching the sections of the orbital arm together.

Referring to the figures by numerals of reference, 1 is a yoke having a clamping-screw 2 therein, at one end of which is arranged a winged head 3, while the other end is swiveled to a plate 4. By means of this device the tellurian may be readily clamped in position upon the edge of a table, disk, or other suitable device. A beveled gear 5 is formed integral with or is fastened rigidly to the upper portion of the yoke 1, and from the center of this gear extends an upwardly-projecting spindle 6. This spindle extends into and forms a bearing for a casting 7, on the top of which is located one end of a plate 8, substantially circular in form and having upwardly-curved arms 9 at intervals thereon at the periphery thereof, said arms serving to prevent displacement of the transparent or translucent globe 10. Arms 11 are struck up from the center of plate 8 and serve to hold a candle or other similar device in an upright position within the globe. The plate 8 is fastened to the spindle 6.

An internally-threaded recess 12 extends into one end of casting 7 and is adapted to receive the threaded end of a tube 13. This tube is connected at one end to the end of a similar tube 14 by means of a sleeve 15, having inwardly-extending internally-threaded recesses 16 in the ends thereof, and a passage 17, extending through the partition 18, formed between said recesses. Set-screws 19 are employed for binding the sleeve in position upon the tubes 13 and 14, and these tubes, together with the sleeve 15, form the orbital arm of the tellurian. The outer end of tube 14 is screw-threaded and projects into an internally-threaded aperture 20, formed within one end of a head 21, having a circular recess 22 in the top thereof, which is provided with gear-teeth 23 upon the wall thereof. A slot 24 is formed within the bottom of the head 21, and arranged therein is a beveled gear 25, which is secured to one end of a shaft 26. This shaft extends longitudinally through the orbital arm and bears at its ends and at the center within the casting 7 and head 21 and the partition 18, respectively. A beveled gear 27 is secured to that end of shaft 26 which is arranged within the casting 7, and this gear revolves in a recess 28, formed within casting 7, and meshes with the beveled gear 5 upon the yoke 1.

A stem 29 is mounted within head 21 and has a beveled gear 30 upon the upper end thereof, which bears upon the bottom of the circular recess 22. This gear meshes with the gear 25 and has an extension 31 at one side thereof, the top and bottom of which are parallel and arranged at an incline to the top of gear 30. A passage 32 is formed with extension 31 and extends therethrough at right angles to the top and bottom thereof, and mounted upon the extension is a beveled gear 33, which meshes with the teeth 23 within recess 22 and is provided with an enlarged cylindrical head 34, having a circular recess 35 in the top thereof. A yoke 36 is arranged above the gear 33 and has a stem 37 extending downward therefrom and integral therewith, and this stem projects through the gear 33 and the passage 32 in extension 31 and forms a bearing for said gear 33. The yoke 36 is circular in form, as illustrated in Fig. 1, and has a rod 38 journaled therein and extending therethrough, one end of this rod being provided with a gear 39, which meshes with the teeth 35 of the cylindrical head 34. An earth sphere 40 is secured upon the rod 38, and said rod serves as the axis therefor, and, as shown in the drawings, is arranged at an angle to the axis of the sphere-holding yoke 36. An arm 41 projects from the cylindrical head 34 and has an extension 42, which projects from the upper end thereof at an angle thereto, and upon this extension is mounted a sleeve 43, which is connected to the moon sphere 44 of the device. This sleeve 43 can be adjusted to a desired point upon the arm 41 by means of a set-screw 45.

When it is desired to operate the device herein described, a lighted candle is placed within the globe or sun sphere 10 and the orbital arm is rotated at a desired speed. As gear 5 is fixed, it is obvious that this movement of the arm will cause said gear to rotate the gear 27 and shaft 26. Motion is thus imparted to the gear 25, which in turn rotates gear 30 and the extension 31 thereon. One revolution of this gear 30 will occur during each revolution of the orbital arm about the sun sphere 10 and the inclination of the axis 38 of the earth sphere will be continually changed in relation to the sphere 10 during the rotation of the orbital arm, so as to correspond with the position of the earth in relation to the sun at the various seasons of the year. As gear 30 rotates, carrying therewith the supporting-yoke of the earth sphere, the gear 33 carried thereby is rotated upon the fixed teeth 23 and causes the arm 41, carrying the moon sphere, to gradually rotate about the earth sphere. The teeth 35 within the cylindrical head of gear 33 causes the similar beveled gear 39 to rapidly rotate and to turn the earth sphere 40 therewith. All of the gears used within this apparatus are of such size and proportions as to permit the parts to operate in proper relation to each other.

It will be seen that by using this apparatus all of the phenomena of the planetary system may be accurately reproduced, and the device will therefore be found exceedingly useful for educational purposes.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a tellurian, the combination with a swinging orbital arm; of a revoluble shaft therein adapted to be rotated during the movement of the arm, an inclined gear, means operated by said shaft, whereby rotary and circular movement is imparted to the inclined gear, a rod above and adapted to be rotated by the inclined gear, an earth sphere revoluble with the rod, an arm extending from the inclined gear, and a moon sphere thereon and movable therewith.

2. In a tellurian, the combination with a yoke having a clamping-screw therein, a gear integral with the yoke, and a stem projecting from the gear; of an orbital arm mounted upon said stem, a supporting-plate secured to the stem and eccentric thereto, and a sun sphere upon said plate.

3. In a tellurian, the combination with a swinging orbital arm; of a shaft journaled therein and adapted to be rotated when the arm is moved, a gear upon said shaft, a second gear meshing therewith, an extension to said second gear having an inclined bearing-face, an inclined gear mounted upon said bearing-face and adapted to be rotated upon the face, an earth-sphere-supporting yoke journaled upon the inclined gear, a rod revolubly mounted within the yoke, an earth sphere secured thereto, said rod being adapted to be rotated by the inclined gear, a moon sphere, and an arm connecting said sphere with the inclined gear.

4. In a tellurian, the combination with a swinging orbital arm having a shaft journaled therein; of a slotted head detachably secured to one end of said arm and having a circular recess in the top thereof, teeth integral with the wall of said recess, a gear within the slot and secured to the shaft, a beveled gear mounted within the recess and meshing with the gear upon the shaft, an extension to the beveled gear having an inclined bearing-face, an inclined beveled gear adapted to rotate upon said extension and meshing with the teeth in the recess, a recessed cylindrical head to the inclined gear, a yoke journaled upon said head, a revoluble rod journaled upon the yoke, a gear thereon, teeth within the recess of the cylindrical head and adapted to engage the gear of the rod, an earth sphere upon the rod, a moon sphere, and an arm connecting said moon sphere with the inclined gear.

In testimony whereof I affix my signature in presence of two witnesses.

JAMES LOUIS VAN NORT.

Witnesses:
W. E. BELL,
T. E. BELL.